July 8, 1924.　　　　　　　　　　1,500,937
G. F. HOTOPP
KNOCKDOWN STEPLADDER
Filed Dec. 13, 1923　　　3 Sheets-Sheet 1
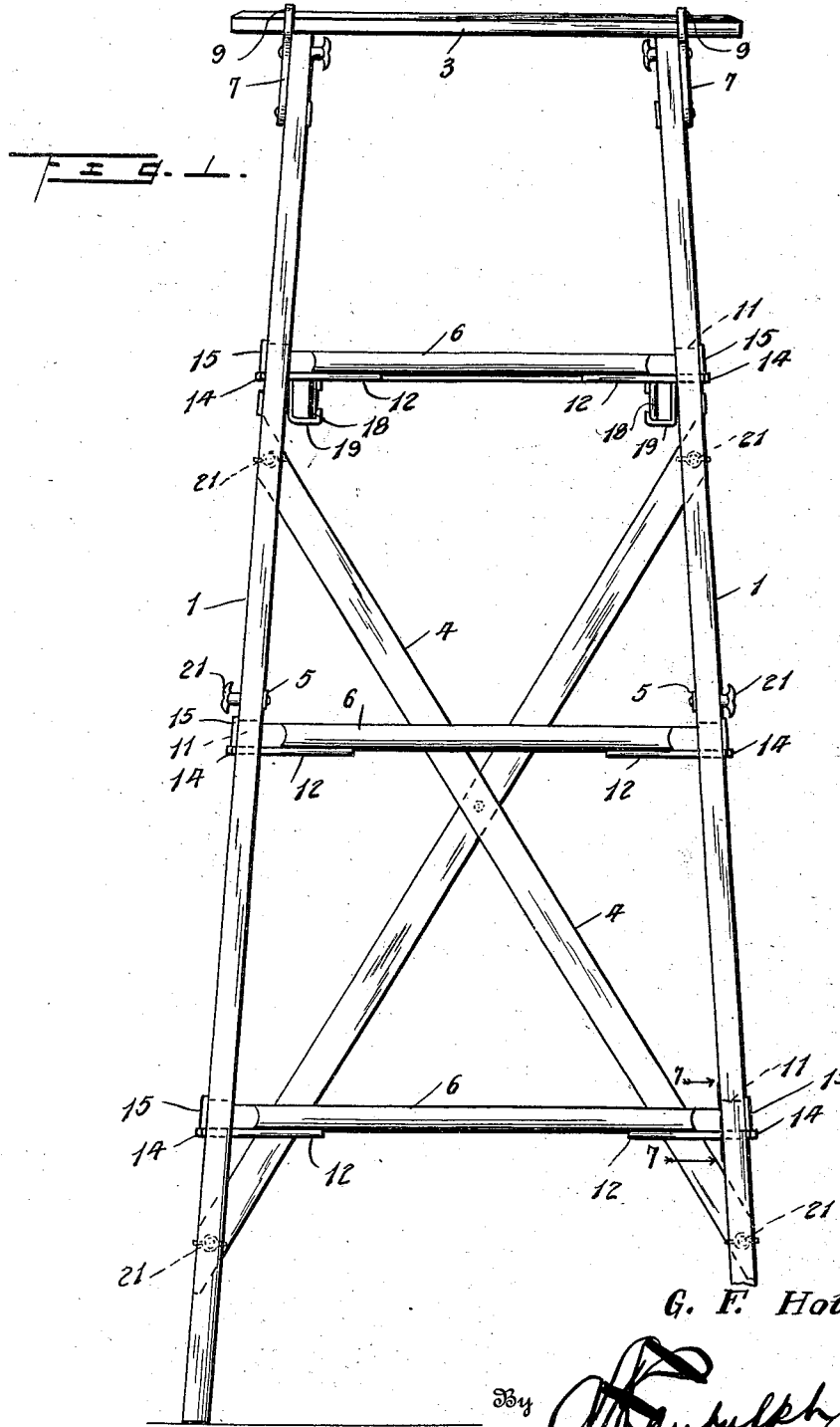
Inventor
G. F. Hotopp,
By
Attorney

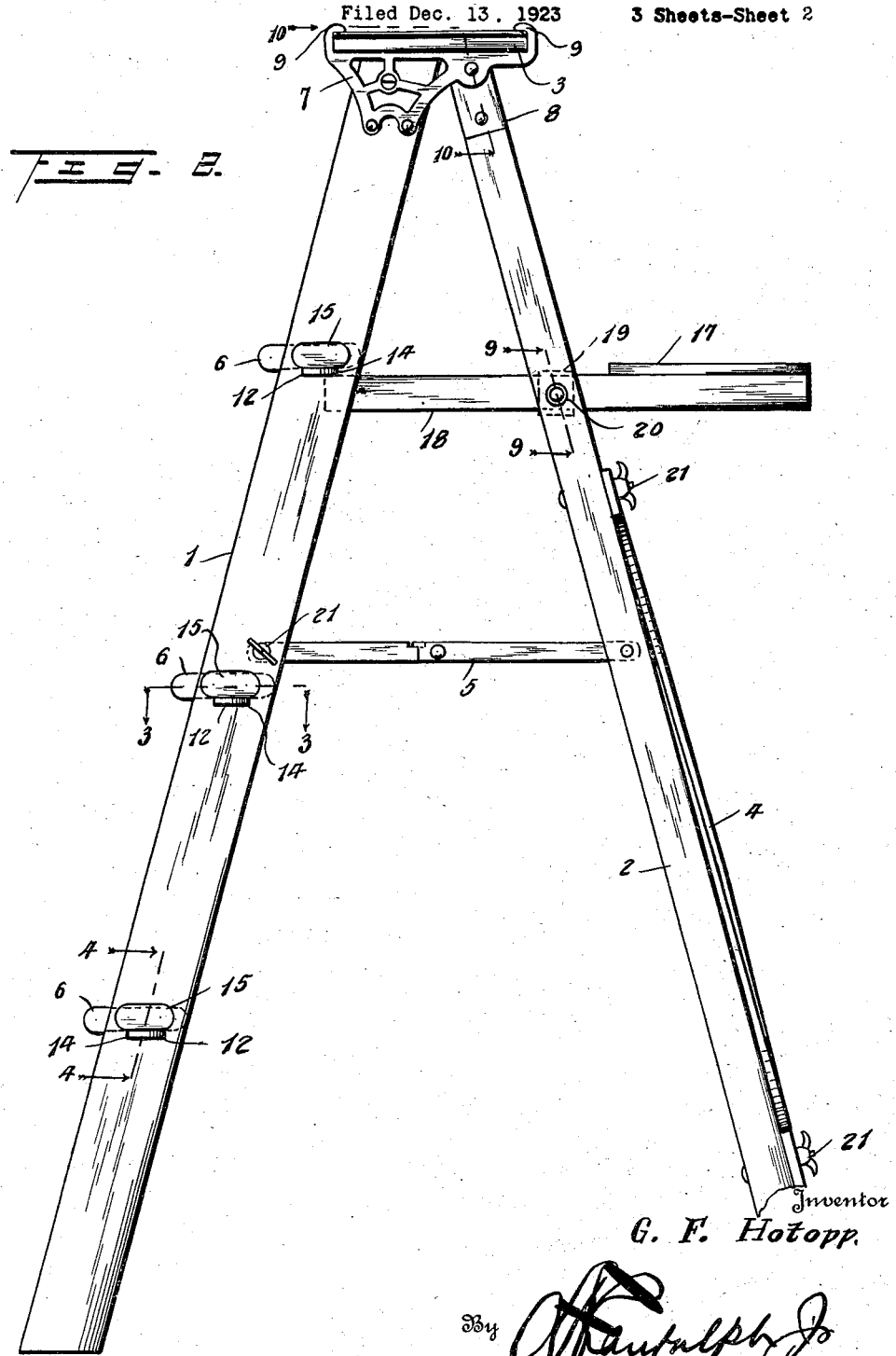

July 8, 1924.
G. F. HOTOPP
1,500,937
KNOCKDOWN STEPLADDER
Filed Dec. 13, 1923    3 Sheets-Sheet 3
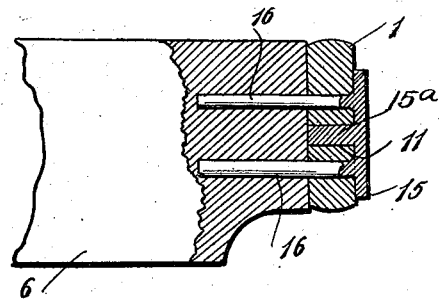
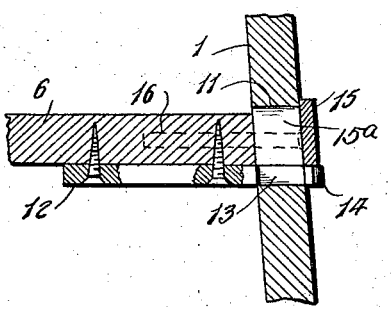
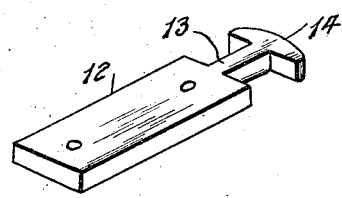
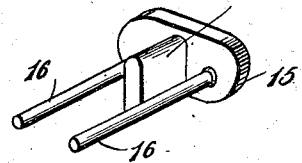
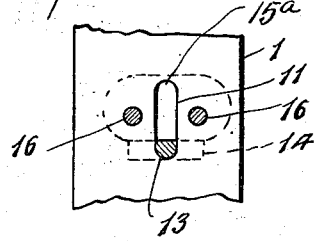
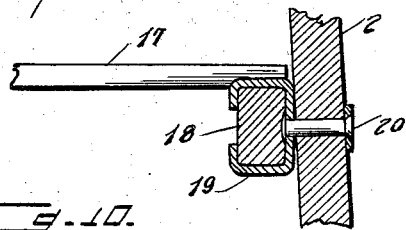
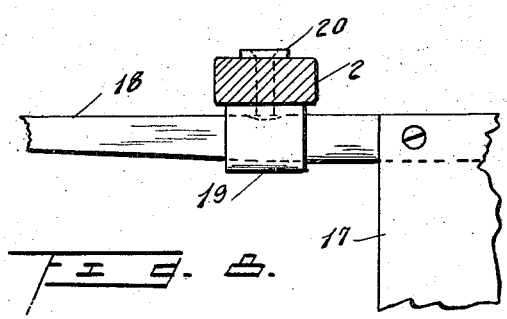
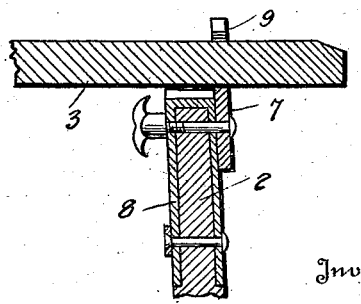
Inventor
G. F. Hotopp.
By
Attorney Patented July 8, 1924.

1,500,937

UNITED STATES PATENT OFFICE.

GEORGE F. HOTOPP, OF CINCINNATI, OHIO.

KNOCKDOWN STEPLADDER.

Application filed December 13, 1923. Serial No. 680,499.

*To all whom it may concern:*

Be it known that I, GEORGE F. HOTOPP, a citizen of the United States, residing at Cincinnati, in the county of Hamilton and State of Ohio, have invented certain new and useful Improvements in Knockdown Stepladders; and I do hereby declare the following to be a full, clear, and exact description of the invention, such as will enable others skilled in the art to which it appertains to make and use the same.

The invention relates to ladders and more particularly to the kind which is self-supporting and distinguished as step ladders, and the principal object in view is the provision of an article of the nature stated which may be readily assembled and easily and quickly taken apart for storage or transportation, and which when assembled is strong, braced, easily handled, neat in appearance and relatively light in structure.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawings forming a part of the application:

Figure 1 is a front view of a knock-down step ladder embodying the invention,

Figure 2 is a side view thereof,

Figure 3 is a sectional detail on the line 3—3 of Figure 2,

Figure 4 is a sectional detail on the line 4—4 of Figure 2,

Figure 5 is a detail perspective view of a step clip,

Figure 6 is a detail perspective view of a clip lock and step support,

Figure 7 is an enlarged sectional detail on the line 7—7 of Figure 1,

Figure 8 is a detail view showing a pivoted socket member for the arm of the pail rest, Figure 9 is a detail section on the line 9—9 of Figure 2, and Figure 10 is an enlarged sectional detail on the line 10—10 of Figure 2.

Corresponding and like parts are referred to in the following description and designated in the several views of the drawings by like reference characters.

The ladder comprises front legs or rises 1, back legs 2, a top 3, crossed braces 4 for the back legs 2, folding braces 5 connecting the front and back legs, and steps or rungs 6 which are connected to the legs 1. Fastenings 7 are secured to the upper ends of the legs 1 and the legs 2 are pivoted to said fastenings and are reinforced at their upper ends by U-irons 8 which are secured thereto and which receive the pivot fastenings connecting the legs 2 to the fastenings 7. Hooks 9 at opposite ends of the fastenings 7 engage about the front and rear edges of the top 3 and hold it in place.

Vertical slots 11 are formed in the legs 1 opposite the steps 6 and are designed to receive the outer ends of plates or clips 12 which are secured to the ends of the steps 6. The plates or clips 12 are reduced adjacent their outer ends to provide a neck 13 and a crosshead 14, the neck 13 corresponding to the width of the slots 11 and the crosshead 14 extending crosswise of said slot whereby to confine the legs between the shoulders or projecting parts at opposite ends of the neck 13. When assembling the steps, the clips or plates 12 assume a position to register with the slots 11, thereby admitting of the crosshead 14 passing through the slot 11 after which the plate is turned to cause the crosshead to extend crosswise of the slot 11, thereby securing the plate or clip 12. After the crosshead 14 clears the outer side of the leg 1 and is given a one-quarter turn to assume a position at a right angle to the slot, the plate is moved downwardly to engage the lower end of the slot. Vertical movement of the plate or clip 12 and the steps 6 attached thereto is prevented by means of a lock having a head 15 which also serves to close the outer side of the slot 11, and has a stud or tongue 15ª to enter the upper portion of said slot, said stud or tongue 15ª engaging neck 13, while the head of the lock 15 engages the crosshead 14. A pair of pins 16 project inwardly from the head 15 and enter registering openings formed in the leg 1 and step 6, said pins being disposed upon opposite sides of the stud or tongue 15ª and slot 11 and operating to hold the plate 15 in place and to provide an additional support for the steps.

The numeral 17 designates a pail rest which is provided with arms 18 which slip into socket members 19 pivoted to the legs 2, as indicated at 20. The arms 18 taper slightly so as to engage the socket members 19 by a wedging action, whereby the pail rest is held in place. By having the socket members 19 pivoted to the legs 2, they turn freely with the pail rest and admit of the latter folding. The arms 18 are of a length to engage under a step and support the pail rest in horizontal position.

The folding braces 5 are detachably connected to the front legs 1 by means of thumb screws 21 and the crossed braces 4 are similarly connected to the legs 2 by like fastening means 21. The latter is so constructed as to admit of the parts being readily assembled or taken apart as required. The top 3 is detachably held in place by means of the hooks 9 of the side castings 7 and the pail rest 17 may be readily disengaged from the socket members 19, and the steps 6 easily and quickly disconnected from the legs 1 by withdrawing the lock 15 and lifting and turning the steps 6 to cause the cross heads 14 of the clip 12 to register with the slots 11, thereby admitting of the legs 1 being readily removed.

What is claimed is:

1. In a ladder of the character described, uprights provided with slots in the length thereof, clips secured to the rungs and each provided at its outer end with a crosshead which is adapted to pass through a slot of the upright and to be turned to assume a position crosswise thereof and on the opposite side of the upright from the end of the rung to secure the rung to the upright, and a lock secured to the upright and engaging the crosshead of the clip to prevent movement thereof.

2. In a ladder of the character described, uprights provided with slots in the length thereof, clips secured to the rungs and each provided at its outer end with a crosshead which is adapted to pass through a slot of the respective upright and to be turned to assume a position crosswise thereof and secure the rung and upright together, and a lock secured to the upright and engaging the crosshead of the clip to prevent movement thereof, said lock being provided with pins to enter registering openings of the upright and rung and disposed upon opposite sides of the slot.

3. In a ladder of the character described, uprights provided with vertically disposed slots, steps, plates secured to end portions of the steps and each plate having its outer end reduced to provide a neck and a crosshead, the latter adapted to pass through a slot of the upright and to be turned to assume a position crosswise of the slot, and a lock plate provided with a pair of pins to enter registering openings formed in the upright and a step upon opposite sides of the slot, said plate closing the outer side of the slot and engaging the crosshead of the clip to hold the step in place.

4. Means to secure the rungs of a ladder to its upright comprising slots arranged longitudinally of the uprights, each slot having a plate secured to each end thereof and having an integral crosshead inserted through a slot and a neck to seat therein, and a locking member having a head to engage the head on the clip and the upright, a tongue to engage the slot in the upright, and pins to seat in openings in the upright and rung.

In testimony whereof I affix my signature in presence of two witnesses.

GEORGE F. HOTOPP.

Witnesses:
JOSEPH A. NARDINI,
GEO. A. HOTOPP.